United States Patent
Iwaki (10) Patent No.: US 7,619,619 B2
(45) Date of Patent: Nov. 17, 2009

(54) INFORMATION PROCESSING APPARATUS AND DISPLAY CONTROL METHOD

(75) Inventor: Tsutomu Iwaki, Hannou (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 520 days.

(21) Appl. No.: 11/024,034

(22) Filed: Dec. 29, 2004

(65) Prior Publication Data

US 2006/0017712 A1    Jan. 26, 2006

(30) Foreign Application Priority Data

Jul. 21, 2004    (JP)    ............... P2004-213570

(51) Int. Cl.
    G09G 5/00    (2006.01)
(52) U.S. Cl. .................... 345/204; 345/690
(58) Field of Classification Search ............ 345/102, 345/690, 204; 375/240.26; 348/584, 590; 358/22; 382/233
See application file for complete search history.

(56) References Cited

U.S. PATENT DOCUMENTS

| | | | |
|---|---|---|---|
| 5,218,432 A * | 6/1993 | Wakeland | ............ 348/590 |
| 5,587,744 A | 12/1996 | Tanaka | |
| 5,760,760 A * | 6/1998 | Helms | ............ 345/102 |
| 5,943,064 A | 8/1999 | Hong | |
| 6,002,446 A | 12/1999 | Eglit | |
| 6,108,047 A | 8/2000 | Chen | |
| 6,208,326 B1 * | 3/2001 | Frederick et al. | ............ 345/690 |
| 6,317,164 B1 | 11/2001 | Hrusecky et al. | |
| 6,411,306 B1 * | 6/2002 | Miller et al. | ............ 345/690 |
| 6,600,747 B1 | 7/2003 | Sauber | |
| 6,784,941 B1 | 8/2004 | Sue et al. | |
| 6,798,420 B1 | 9/2004 | Xie | |
| 6,839,094 B2 | 1/2005 | Tang et al. | |
| 6,839,903 B1 | 1/2005 | Shintani et al. | |
| 7,030,934 B2 * | 4/2006 | Shy et al. | ............ 348/584 |
| 7,106,383 B2 | 9/2006 | Kahn | |
| 7,206,027 B2 | 4/2007 | De Haan et al. | |
| 7,224,401 B2 | 5/2007 | Ackley et al. | |
| 7,248,303 B2 | 7/2007 | Iwaki | |

(Continued)

FOREIGN PATENT DOCUMENTS

CN    1186269    7/1998

(Continued)

OTHER PUBLICATIONS

Chinese Office Action dtd Feb. 22, 2008, in corresponding foreign application, English translation and original Chinese documents, 15 pp.

*Primary Examiner*—Amare Mengistu
*Assistant Examiner*—Yuk Chow
(74) *Attorney, Agent, or Firm*—Pillsbury Winthrop Shaw Pittman, LLP (57) ABSTRACT

A graphics controller generates a video signal for forming a display image to be displayed on the display device. A high quality video engine performs a high quality video process on the video signal generated by the graphics controller. When a user performs a luminance change operation for changing the luminance of a light in the display LCD, values of various parameters (such as contrast, brightness, hue, saturation, gamma correction value, etc.) to be used in the high quality video process of the high quality video engine are changed through an application, an intermediate module, a BIOS, and an embedded controller/keyboard controller.

17 Claims, 5 Drawing Sheets

U.S. PATENT DOCUMENTS

| | | |
|---|---|---|
| 7,304,685 B2 | 12/2007 | Park et al. |
| 2002/0057281 A1 | 5/2002 | Moroo et al. |
| 2002/0122046 A1 | 9/2002 | Dischert et al. |
| 2002/0145610 A1 | 10/2002 | Barilovits et al. |
| 2003/0038823 A1 | 2/2003 | Pasqualini et al. |
| 2003/0142085 A1* | 7/2003 | Taniguchi et al. ........... 345/204 |
| 2004/0075769 A1 | 4/2004 | Shy et al. |
| 2004/0223058 A1 | 11/2004 | Richter et al. |
| 2004/0233997 A1* | 11/2004 | Umesako ............... 375/240.26 |
| 2005/0018077 A1 | 1/2005 | De Haan et al. |
| 2005/0027994 A1 | 2/2005 | Sai |
| 2005/0062891 A1 | 3/2005 | Tang et al. |
| 2005/0262445 A1 | 11/2005 | Kizaki et al. |
| 2005/0268236 A1 | 12/2005 | Kosaka |
| 2006/0012714 A1 | 1/2006 | Louie et al. |
| 2006/0017852 A1 | 1/2006 | Iwaki |
| 2006/0023121 A1 | 2/2006 | Obara et al. |
| 2006/0056716 A1* | 3/2006 | Komeno ..................... 382/233 |
| 2006/0066507 A1 | 3/2006 | Yanagisawa |
| 2006/0066639 A1 | 3/2006 | Iwaki |
| 2006/0085145 A1 | 4/2006 | Matsuoka et al. |
| 2006/0181645 A1 | 8/2006 | Sarika |
| 2006/0187361 A1 | 8/2006 | Fujine et al. |
| 2007/0015018 A1 | 1/2007 | Tsutsui |
| 2007/0097402 A1 | 5/2007 | Chen |
| 2007/0129882 A1 | 6/2007 | Sano et al. |
| 2007/0211167 A1 | 9/2007 | Adams et al. |

FOREIGN PATENT DOCUMENTS

| | | |
|---|---|---|
| CN | 1459089 A1 | 11/2003 |
| CN | 1578458 | 2/2005 |
| EP | 0 653 742 | 10/1994 |
| JP | 2000-148128 | 5/2000 |
| JP | 2002-108486 | 4/2002 |
| JP | 2002-278522 | 9/2002 |
| JP | 2002-312155 | 10/2002 |
| JP | 2002-314970 | 10/2002 |
| JP | 2004-336178 | 11/2004 |
| JP | 2005-051558 | 2/2005 |
| WO | 02075714 A1 | 9/2002 |

* cited by examiner

| DESIGNATED LUMINANCE LEVEL | PARAMETERS FOR HVE |
|---|---|
| 8 | A (CORRESPONDING TO 300-600Cd) |
| 7 | B (CORRESPONDING TO 200-300Cd) |
| 6 | B (CORRESPONDING TO 200-300Cd) |
| 5 | B (CORRESPONDING TO 200-300Cd) |
| 4 | B (CORRESPONDING TO 200-300Cd) |
| 3 | C (CORRESPONDING TO 20-200Cd) |
| 2 | C (CORRESPONDING TO 20-200Cd) |
| 1 | C (CORRESPONDING TO 20-200Cd) |

FIG. 6

| DESIGNATED LUMINANCE LEVEL | PARAMETERS FOR HVE |
|---|---|
| 8 | D (CORRESPONDING TO 600Cd) |
| 7 | E (CORRESPONDING TO 500Cd) |
| 6 | F (CORRESPONDING TO 400Cd) |
| 5 | G (CORRESPONDING TO 300Cd) |
| 4 | H (CORRESPONDING TO 200Cd) |
| 3 | I (CORRESPONDING TO 100Cd) |
| 2 | J (CORRESPONDING TO 50Cd) |
| 1 | K (CORRESPONDING TO 20Cd) |

FIG. 7

INFORMATION PROCESSING APPARATUS AND DISPLAY CONTROL METHOD

RELATED APPLICATIONS

The present disclosure relates to the subject matter contained in Japanese Patent Application No. 2004-213570 filed on Jul. 21, 2004, which is incorporated herein by reference in its entirety.

BACKGROUND OF THE INVENTION

1. Field of the Invention

The present invention relates to an information processing apparatus that displays image data on a display device, and a display control unit for use in the information processing apparatus.

2. Description of the Related Art

In recent years, there has been developed a personal computer having an Audio/Video (AV) playback function similar to that of audio/video (AV) apparatus such as a DVD (Digital Versatile Disc) player or a TV set. Such a personal computer needs a device for making it possible to display a high-quality image on a display device such as an LCD in accordance with AV data etc. to be reproduced.

For example, JP-A-2002-278522 discloses a technique as follows. That is, a table is stored in a ROM 50 in advance. The table includes a plurality of entries in which the light-emission luminance of a light (front light) of an image display device and the contents to be displayed on a display panel are provided in one-to-one correspondence to image quality adjustment parameters (edge enhancement information, color gain information and contrast information) which have to be set in accordance with the display contents. The image quality of the image to be displayed on the display panel is adjusted by image quality adjustment parameters read from the table correspondingly to the light-emission luminance of the light and the current contents to be displayed.

SUMMARY OF THE INVENTION

When an image sequence of a TV program or the like is displayed on an LCD, the appearance of the image changes largely in accordance with the magnitude of the luminance of a backlight. Particularly in a recent LCD for use in a personal computer, the backlight can be brightened considerably. Thus, there is a large difference between the maximum luminance and the minimum luminance the backlight can gain. Therefore, for example, when a user changes the set luminance of the backlight to the maximum, flashing highlights occurs in bright highlights of the image. On the contrary, when the user changes the set luminance of the backlight to the minimum, black level saturation occurs in dark shadows of the image. In such a case, the quality of the image displayed on the LCD cannot be kept uniform.

Although the quality of an image can be adjusted by the image quality adjustment parameters in the technique disclosed in the aforementioned document JP-A-2002-278522, the technique cannot cope with the case where the user operates to change the set luminance of the backlight to the maximum or the minimum as mentioned above. Thus, the quality of the image cannot be kept uniform.

The present invention is developed in consideration of such circumstances. It is one of objects of the invention to provide information processing apparatus and a display control method in which a high-quality image display can be kept in spite of an operation for changing the luminance of a light of a display device.

According to a first aspect of the invention, there is provided an information processing apparatus including: a body; a first signal processing unit that generates a first signal for displaying an image on a display device connected to the body; a second signal processing unit that performs an image quality improving process upon the first signal to generate a second signal for displaying an image on the display device; and a control unit that control the second signal processing unit to generate the second signal in accordance with a luminance level of the display device.

According to a second aspect of the invention, there is provided a display control method for displaying image on a display device, the method including: generating by a first signal processing unit a first signal for displaying an image on the display device; generating a second signal for displaying an image on the display device by performing an image quality improving process upon the first signal in accordance with a luminance level of the display device by a second signal processing unit; and displaying the image on the display device in accordance with the second signal.

BRIEF DESCRIPTION OF THE DRAWINGS

The above objects and advantages of the present invention will become more apparent by describing in detail exemplary embodiments thereof with reference to the accompanying drawings, wherein.

DETAILED DESCRIPTION OF THE PREFERRED EMBODIMENTS

Referring now to the accompanying drawings, a description will be given in detail of a preferred embodiment of the invention.

Herein, a description will be made about the configuration of information processing apparatus according to an embodiment of the invention with reference to FIGS. 1 and 2. The information processing apparatus is, for example, implemented as a notebook type personal computer 10.

Figure 1:
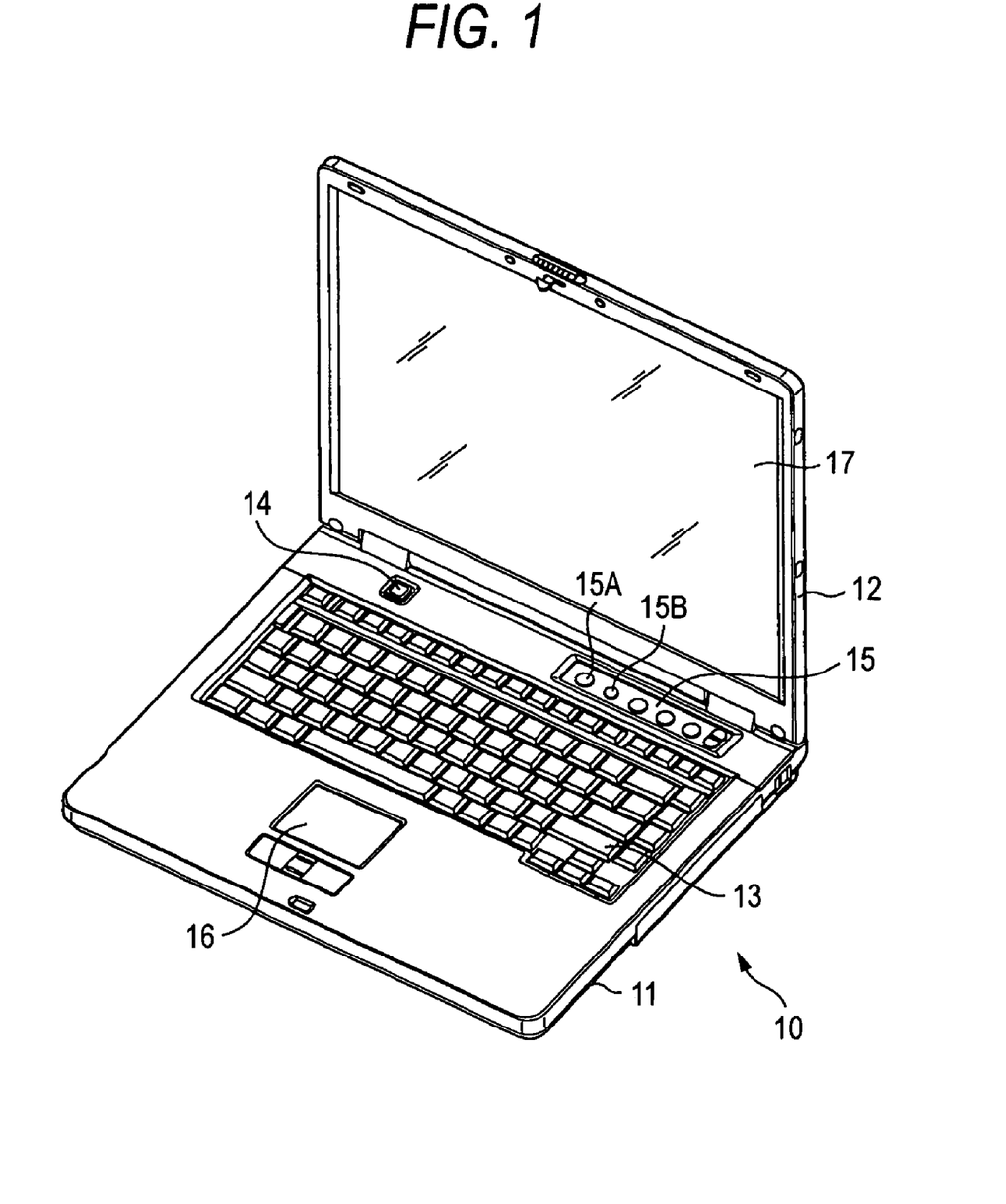
FIG. 1 is a perspective view showing the outline of a computer according to an embodiment of the invention.

FIG. 1 is a perspective view of the notebook type personal computer 10 whose display unit has been opened. The computer 10 is constituted by a computer body 11 and a display unit 12. A display device constituted by an LCD (Liquid Crystal Display) 17 is built in the display unit 12 so that the display screen of the LCD 17 is placed substantially in the center of the display unit 12. The display screen of the LCD 17 has an aspect ratio of 16:9 capable of supporting a high density (HD) image.

The display unit 12 is attached to the computer body 11 so as to be rotatable between an opened position and a closed position. The computer body 11 has a low-profile box-like housing. A keyboard 13, a power button 14 for turning on/off the power of the computer 1, an input operation panel 15, a touch pad 16, etc. are disposed in the upper face of the housing of the computer body 11.

The input operation panel 15 is an input device for inputting an event corresponding to a pushed button. The input operation panel 15 has a plurality of buttons for activating a plurality of functions respectively. The set of buttons includes a TV start button 15A and a DVD/CD start button 15B. The TV start button 15A is a button for reproducing TV broadcast program data. When a user pushes down the TV start button 15A, an application program for reproducing TV broadcast program data is activated automatically. The DVD/CD start button 15B is a button for reproducing video contents recorded in a DVD or a CD. When the user pushes down the DVD/CD start button 15B, an application program for reproducing video contents is activated automatically.

In the computer 10 according to this embodiment, a function of automatically enhancing the image quality of moving image data such as TV broadcast program data or video contents when the moving image data are reproduced is provided for displaying the moving image data on the LCD 17 with high image quality.

Next, with reference to FIG. 2, description will be made about the system configuration of the computer 10.

Figure 2:
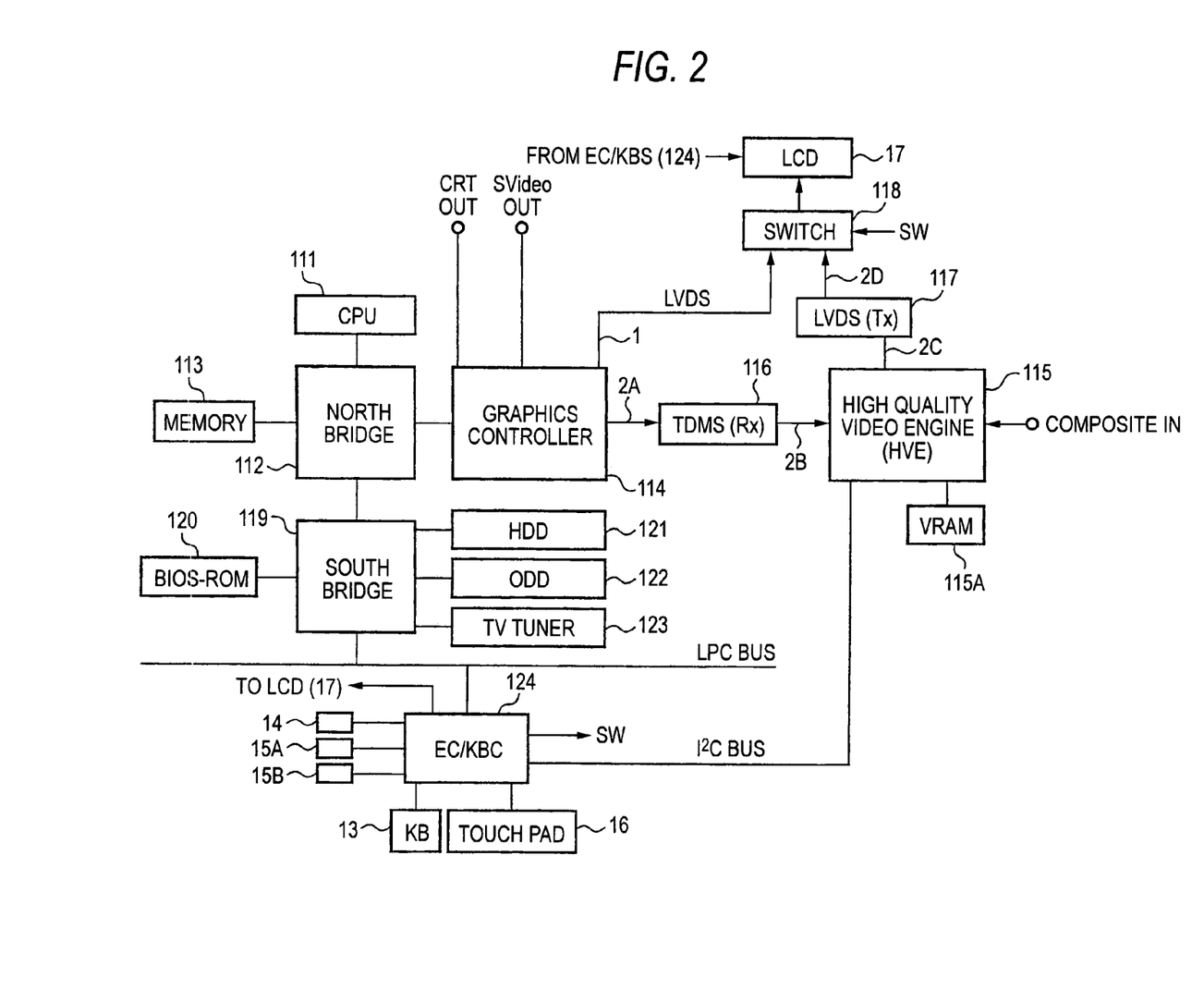
FIG. 2 is a block diagram showing the system configuration of the computer shown in FIG. 1.

As shown in FIG. 2, the computer 10 has a CPU 111, a north bridge 112, a main memory 113, a graphics controller 114, a high quality video engine (HVE) 115, a TMDS (Rx) processing portion 116, an LVDS (Tx) processing portion 117, a switch 118, a south bridge 119, a BIOS-ROM 120, a hard disk drive (HDD) 121, an optical disk drive (ODD) 122, a TV tuner 123, an embedded controller/keyboard controller IC (EC/KBC) 124, etc.

The CPU 111 is a processor provided for controlling the operation of the computer 10. The CPU 111 executes an operating system (OS) and various application programs loaded from the hard disk drive (HDD) 121 to the main memory 113. The OS has a window system for displaying a plurality of windows on the display screen.

Moving image data (such as TV broadcast program data received by the TV tuner 123, video contents stored in a storage medium such as DVD, etc.) are generally displayed in a window corresponding to a video playback application program for reproducing the moving image data. In this case, for example, the window corresponding to the video playback application program is disposed on a desktop screen, and the moving image data are displayed in the window (window mode). Alternatively, the computer 10 can display the moving image data on the display screen of the LCD 17 in a full screen mode. In the full screen mode, only the moving image data are displayed in substantially all the area on the display screen. In this case, windows corresponding to any other application program than the video playback application program are not displayed. In addition, a menu bar or the like for the window corresponding to the video playback application program is not displayed, but only the moving image data are displayed in substantially all the area on the display screen.

The CPU 111 also executes a system BIOS (Basic Input Output System) stored in the BIOS-ROM 120. The system BIOS is a program for controlling the hardware.

The north bridge 112 is a bridge device for connecting a local bus of the CPU 111 with the south bridge 119. The north bridge 112 also includes a memory controller for controlling access to the main memory 113. The north bridge 112 also includes a function of executing communication with the graphics controller 114 through an AGP (Accelerated Graphics Port) bus or the like.

The graphics controller 114 is a display controller for controlling the LCD 17 serving as a display monitor of the computer 10. The graphics controller 114 has a video memory (VRAM). By the graphics controller 114, video signals for forming a display image to be displayed on the LCD 17 are generated from display data drawn in the video memory by the OS/application programs. The display image to be displayed on the LCD 17 is generally composed of an image of the desktop screen and images of windows disposed on the desktop screen. However, when moving image data are displayed in the full screen mode, the display image to be displayed on the LCD 17 is composed of only an image of the moving image data. Accordingly, when moving image data are displayed in the full screen mode, video signals for forming only the display image of the moving image data are output from the graphics controller 114.

Video signals generated by the graphics controller 114 are output to a line 1 and a line 2A respectively. The video signal output to the line 1 is, for example, composed of a 18-bit signal in an LVDS (Low Voltage Differential Signaling) format. On the other hand, the video signal output to the line 2A is, for example, composed of a 24-bit signal in a TMDS (Transition Minimized Differential Signaling) format. The graphics controller 114 also includes an interface for outputting analog video signals to an external CRT (Cathode Ray Tube), and an interface for outputting analog video signals to the outside through an S-video terminal.

In the TMDS (Rx) processing portion 116, the TMDS-format 24-bit signal sent from the graphics controller 114 via the line 2A is converted into a 24-bit RGB digital signal. The TMDS (Rx) processing portion 116 sends the 24-bit RGB digital signal to the high quality video engine (HVE) 115 via the line 2B.

The high quality video engine (HVE) 115 is an image processing controller for executing an image process (hereinafter referred to as "image quality correction process") for enhancing the image quality of video signals generated by the graphics controller 114. The high quality video engine (HVE) 115 has a video memory (VRAM) 115A. The image quality correction process is executed on the video memory (VRAM) 115A. The image quality correction process is an image process dedicated to image sequences and for enhancing the image quality of the image sequences. The image quality correction process is carried out for displaying a smooth and high-quality image sequence on the LCD 17. In the image quality correction process, processing for adjusting the contrast, processing for adjusting the brightness, processing for adjusting the hue, processing for adjusting the saturation, processing for gamma correction, processing for adjusting the white balance, processing for adjusting the luminance, processing for adjusting the sharpness, processing for edge enhancement, processing for improving the response speed, etc. can be performed to improve the image quality of image sequences.

The high quality video engine (HVE) 115 can also perform the image quality correction process on a video signal input from external video equipment via a composite input terminal.

The video signal whose image quality has been corrected by the high quality video engine (HVE) 115 is sent to the LVDS (Tx) processing portion 117 via a line 2C. In the LVDS (Tx) processing portion 117, the quality-corrected RGB digital signal output from the high quality video engine (HVE) 115 is converted into an LVDS (Low Voltage Differential Signaling) format signal. The LVDS (Tx) processing portion 117 sends the LVDS format signal onto a line 2D. Incidentally, when an external LCD panel is used, a connection terminal thereof is connected to an output of the LVDS (Tx) processing portion 117.

Further, the high quality video engine (HVE) 115 includes a scaling function of changing the resolution and the aspect ratio of a video signal. Scaling a video signal is executed after the image correction process is executed on the video signal. In order to display an image sequence with high quality, performing the image quality correction process on data before scaling a video signal subjected to the image quality correction process is preferred to performing an image quality correction process on a video signal subjected to scaling.

The switch 118 serves as a selector for selectively outputting, to the LCD 17, one of the video signal generated by the graphics controller 114 and the video signal subjected to the image quality correction process by the high quality video engine (HVE) 115. The switch 118 has a first input terminal connected to the line 1, a second input terminal connected to the line 2D, and an output terminal connected to the LCD 17. The switch 118 is designed to select one of the first and second input terminals in accordance with a switch control signal SW supplied from the EC/KBC 124, and to connect the selected input terminal to the output terminal. The following two display control modes can be used in this embodiment by the aid of the switch 118.

(1) Normal Mode: In the normal mode, a video signal from the graphics controller 114 is sent to the LCD 17 bypassing the high quality video engine (HVE) 115. For example, the normal mode is used when a still image data is included in a display image to be displayed on the LCD 17.

(2) High Quality Mode: In the high quality mode, a video signal from the graphics controller 114 is sent to the LCD 17 via the high quality video engine (HVE) 115. For example, the high quality mode is used when no still image data is included in a display image to be displayed on the LCD 17, that is, when moving image data are displayed in the full screen mode.

The aforementioned specific example of switching by the switch 118 is merely exemplary. The high quality mode may be always used for any motion/still image data.

The south bridge 119 controls each device on an LPC (Low Pin Count) bus. In addition, the south bridge 119 includes an IDE (Integrated Drive Electronics) controller for controlling the HDD 121 and the ODD 122. Further, the south bridge 119 also includes a function of controlling the TV tuner 123 and a function of controlling access to the BIOS-ROM 120.

The optical disk drive (ODD) 123 is a drive unit for driving a recording medium such as a DVD or a CD storing video contents. The TV tuner 123 is a receiving unit for receiving broadcast program data such as a TV broadcast program.

The embedded controller/keyboard controller IC (EC/KBC) 124 is a one-chip microcomputer in which an embedded controller for power management and a keyboard controller for controlling the keyboard (KB) 13 and the touch pad 16 are integrated. The embedded controller/keyboard controller IC (EC/KBC) 124 has a function of turning on/off the power of the computer 10 in accordance with user's operation on the power button 14.

Further, the embedded controller/keyboard controller IC (EC/KBC) 124 has a function of changing the setting of luminance of a light (such as a backlight) of the LCD 17, a function of making communication with the high quality video engine (HVE) 115 via an I$^2$C bus, and a function of supplying the aforementioned switch control signal SW to the switch 118.

Next, with reference to FIG. 3, description will be made about an example of the configuration of the high quality video engine (HVE) 115.

The high quality video engine (HVE) 115 has an RGB/YUV conversion portion 201, an image quality correction process portion 202, a correction parameter register 203, a YUV/RGB conversion portion 204, etc.

In the RGB/YUV conversion portion 201, the video signal transmitted from the graphics controller 114 through the TMDS (Rx) processing portion 116 is converted from a 24-bit RGB digital signal to a 24-bit YUV signal. The image quality correction process portion 202 performs processing for image quality correction (contrast adjustment, brightness adjustment, hue adjustment, saturation adjustment, gamma correction, white balance adjustment, luminance adjustment, sharpness adjustment, edge enhancement, response speed improvement, etc.) on the YUV signal. Correction values/adjustment values (hereinafter referred to as "correction parameters" simply) suitable for the properties of the LCD 17 are used for each correction/adjustment process. The correction parameters (various parameters related to contrast, brightness, hue, saturation, gamma correction, etc.) for the processing are stored in the correction parameter register 203. The settings of the correction parameters stored in the correction parameter register 203 can be changed by the EC/KBC 124.

A description will be made below about major ones of the correction parameters.

The contrast is adjusted by changing the rate of change in the output intensity with respect to the change of an input signal. That is, in a graph plotted with the abscissa designating the input signal and the ordinate designating the brightness of an image to be displayed, the slope of the graph expresses the intensity of the contrast. When the contrast is increased, the difference between a bright portion (bright highlight) and a dark portion (dark shadow) in the screen becomes so clear that particularly characters or the like can be read easily. However, when the contrast is made too high, the dark portion or the bright portion exceeds a brightness range the display device can express, so that the input signal cannot be reflected properly. Such a phenomenon is referred to as "black level saturation" or "white crushing (or flashing highlights). That is, it is desired that the contrast is increased within a range causing no "black level saturation" or no "white crushing".

The brightness is adjusted by changing the brightness all over the screen uniformly regardless of the input signal. In a graph plotted with the abscissa designating the input signal and the ordinate designating the brightness of an image to be displayed, the height of the graph expresses the brightness. The adjustment of the brightness is effective in adjusting the easiness to view in accordance with the brightness of the environment where the display device is used. However, in the same manner as in the case of the contrast adjustment, when the brightness in a bright portion or a dark portion exceeds a range the display device can express, a phenomenon such as "black level saturation" or "white crushing" occurs. It is therefore desired that the brightness is increased within a range causing no "black level saturation" or no "white crushing".

The response characteristic between a numeric value expressing a color and the depth of a color input or output actually is expressed by a numeric value referred to as "gamma". Any input/output device such as an image scanner, a display device or a printer has its own specific gamma value. Adjusting the gamma value to thereby perform color correction on the system as a whole is called gamma correction. The gamma value is a parameter indicating the degree of nonlinearity in the intensity of an output signal with respect to an input signal. In any display device, it will be ideal if the output intensity (the brightness of the output in the display device) changes linearly with respect to the change in the value of the input signal. However, the ideal cannot be achieved in a real device. When a parameter "I" designates a normalized value of the intensity of the input signal within a range of from 0 to 1 and a parameter "O" designates a normalized value of the intensity of the output signal within the same range, the relationship between the both can be approximated by the expression $O=I\gamma$. The value $\gamma$ in this expression is called a gamma value.

In the YUV/RGB conversion portion 204, the video signal subjected to the image quality correction process is converted from a 24-bit YUV signal to a 18-bit RGB signal. The RGB signal is sent to the LVDS (Tx) processing portion 117 through the line 2C.

Figure 3:
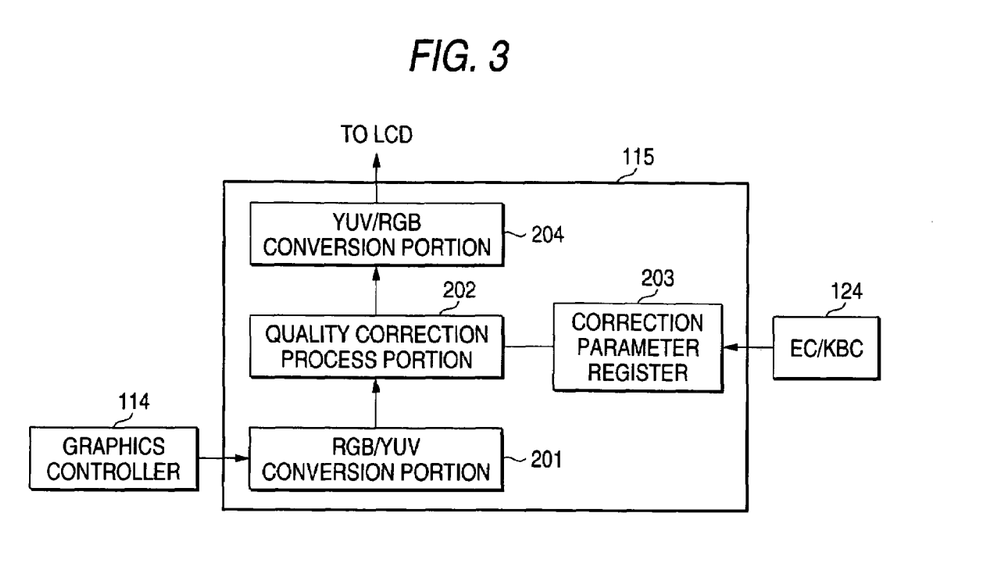
FIG. 3 is a block diagram showing the configuration of a high quality video engine provided in the computer shown in FIG. 1.

Though not shown in FIG. 3, the high quality video engine 115 also includes a scaling process function, by which the YUV signal subjected to the image quality correction process is scaled in accordance with scaling parameter information set in a scaling register. Due to the scaling process, the size (resolution) of the moving image data is changed into a size suitable to the size (panel resolution) of the display screen of the LCD 17. For example, the scaling parameter information includes parameters of the resolution of the moving image data, the aspect ratio of the moving image data, the panel resolution of the LCD 17, etc.

Figure 4:
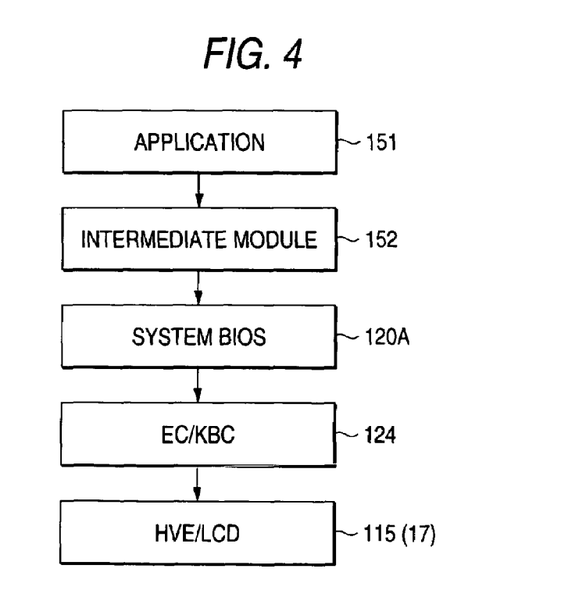
FIG. 4 is a diagram showing an example of an interface for setting correction parameters in the high quality video engine provided in the computer shown in FIG. 1.

FIG. 4 shows an example of an interface for changing the settings of the correction parameters for the high quality video engine 115 in accordance with user's operation for changing the luminance of the backlight of the LCD 17.

The application 151 detects a luminance change event (increasing or decreasing the luminance level) occurring when the user operates a hot key or the like to change the luminance of the backlight of the LCD 17. The application 151 notifies an intermediate module 152 of the detection of the luminance change event.

When receiving the notification of a luminance change instruction from the application 151, the intermediate module 152 calls a luminance changing function of the system BIOS 120A through the HCI (Hardware Configuration Interface), and notifies the system BIOS 120A of an instruction to increase or decrease the luminance level.

Figure 5:
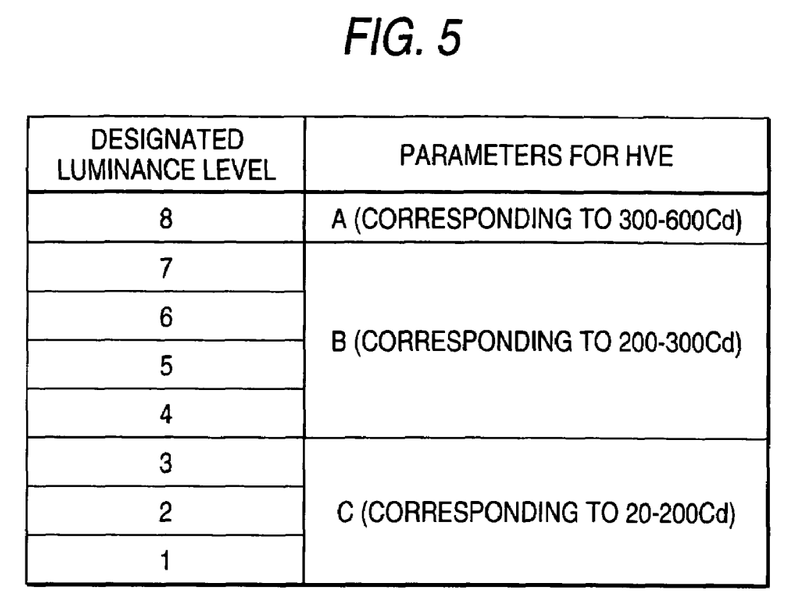
FIG. 5 is a diagram showing an example of a table to be used by a BIOS in FIG. 4.
Figure 6:
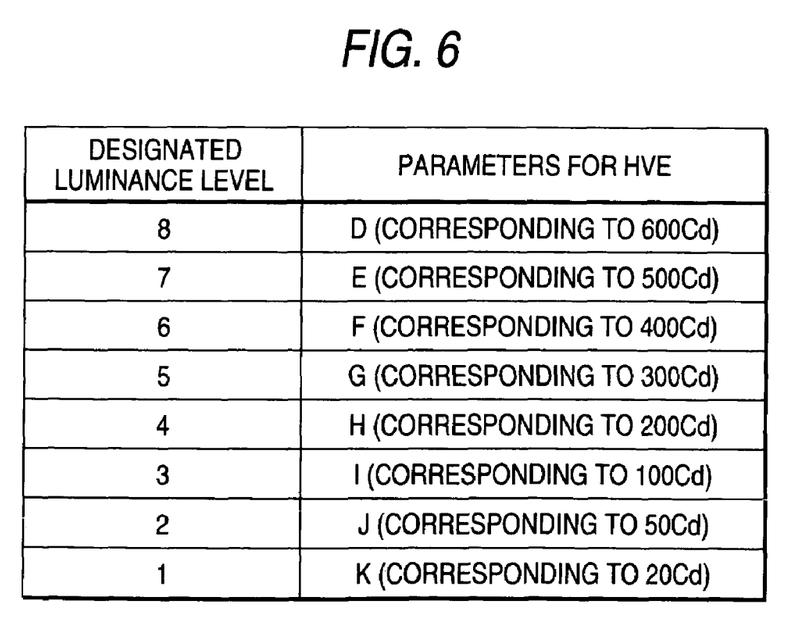
FIG. 6 is a diagram showing another example of a table to be used by a BIOS in FIG. 4.

When receiving the notification of the instruction to increase or decrease the luminance level from the intermediate module 152, the BIOS 120A uses its own luminance changing function to derive values of parameters for the high quality video engine 115 corresponding to the luminance level obtained by increasing or decreasing the current luminance level, for example, by one step, in accordance with the instruction and with reference to a table as shown in FIG. 5 or 6 by way of example. The values of the parameters in this case correspond to values of various parameters determining the contrast, the brightness, the hue, the saturation, the gamma value, etc. of the moving image data to be subjected to the high quality video process by the high quality video engine 115. Values of various parameters for improving the appearance of an image (preventing white crushing or black level saturation from occurring in the image) in accordance with various luminance levels of the backlight of the LCD 17 respectively are registered in the aforementioned table in advance.

In the example of the table shown in FIG. 5, three kinds of parameters for the high quality video engine 115 are associated with eight steps of luminance levels. That is, parameters A (for example, various parameters corresponding to luminance 300-600 Cd) are associated with a luminance level 8, parameters B (for example, various parameters corresponding to luminance 200-300 Cd) are associated with luminance levels 7-4, and parameters C (for example, various parameters corresponding to luminance 20-200 Cd) are associated with luminance levels 3-1. When the example of the table is used, the frequency of execution of changing parameters in accordance with an instruction to increase or decrease the luminance level can be cut down to some extent so that the load on the system BIOS 120A or the like can be lowered.

In the example of the table shown in FIG. 6, eight kinds of correction parameters for the high quality video engine 115 are associated with eight steps of luminance levels. That is, parameters D (for example, various parameters corresponding to luminance 600 Cd) are associated with a luminance level 8, parameters E (for example, various parameters corresponding to luminance 500 Cd) are associated with a luminance level 7, parameters F (for example, various parameters corresponding to luminance 400 Cd) are associated with a luminance level 6, parameters G (for example, various parameters corresponding to luminance 300 Cd) are associated with a luminance level 5, parameters H (for example, various parameters corresponding to luminance 200 Cd) are associated with a luminance level 4, parameters I (for example, various parameters corresponding to luminance 100 Cd) are associated with a luminance level 3, parameters J (for example, various parameters corresponding to luminance 50 Cd) are associated with a luminance level 2, and parameters K (for example, various parameters corresponding to luminance 20 Cd) are associated with a luminance level 1. When the example of the table is used, various parameters the most suitable for each luminance level can be set so finely that a good looking image can be obtained in accordance with the designated luminance level.

When the values of the parameters for the high quality video engine 115 are derived, the luminance changing function of the BIOS 120A sets (resets) the values of the parameters and the value indicating the luminance level into the high quality video engine parameter register and the LCD parameter register provided beforehand in the EC/KBC 124, respectively.

The EC/KBC 124 sets (resets) values of correction parameters into the correction parameter register 203 in the high quality video engine 115 in accordance with the values set in the high quality video engine parameter register, and sets (resets) the luminance of the backlight of the LCD 17 in accordance with the value set in the LCD parameter register.

The high quality video engine 115 performs the high quality video process using the correction parameters set in the correction parameter register 203, and outputs a processed image to the LCD 17 whose backlight luminance has been changed.

Figure 7:
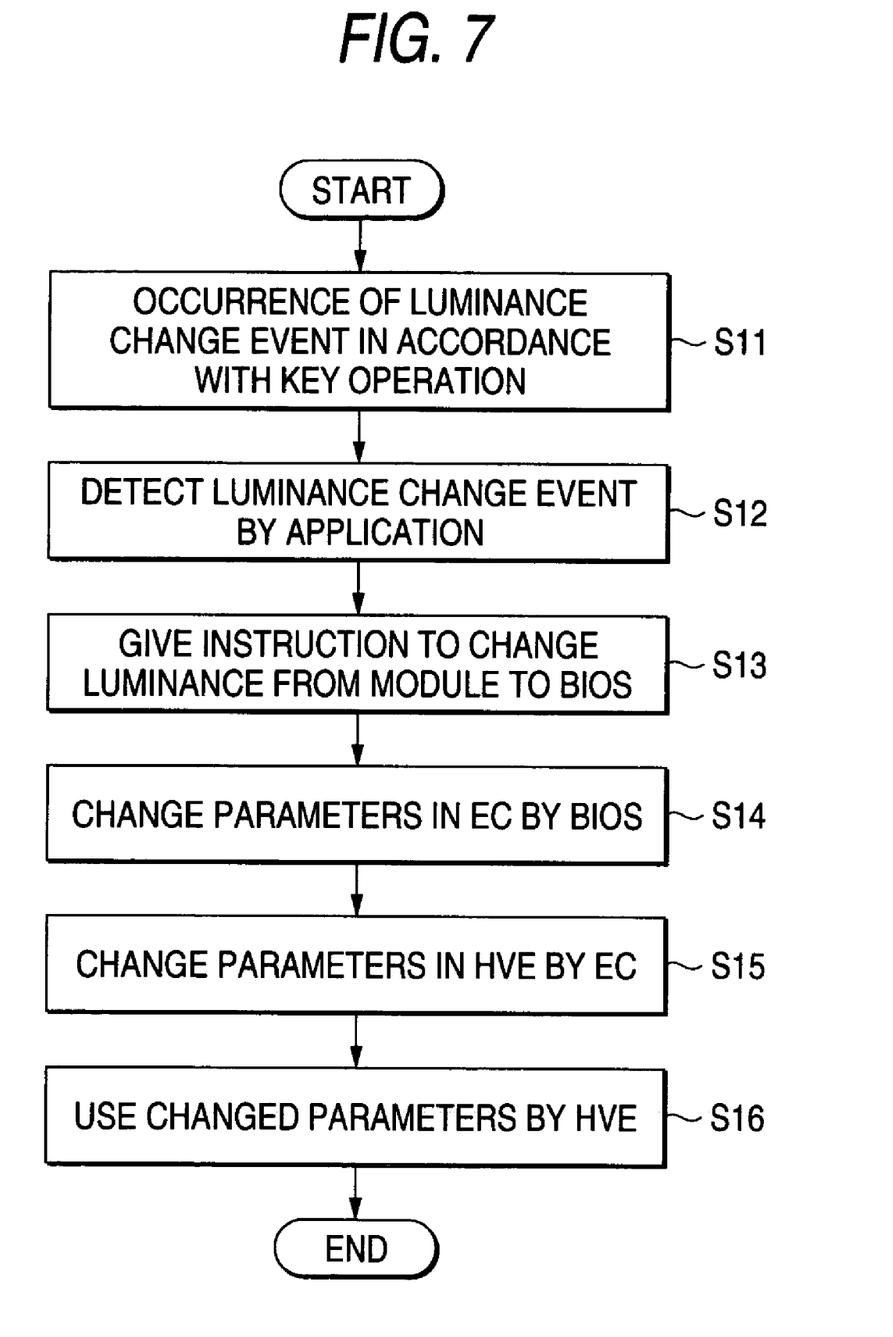
FIG. 7 is a flow chart showing the procedure of a display control process to be executed by the computer shown in FIG. 1.

Next, the operation in response to user's operation for changing the luminance of the backlight of the LCD 17 will be described with reference to FIG. 7.

In response to the user's operation on the hot key etc. for changing the luminance of the backlight of the LCD 17, a luminance change event (increasing or decreasing the luminance level) occurs (Step 11).

When detecting the occurrence of the luminance change event, the application 151 notifies the intermediate module 152 of the detection of the occurrence (Step 12).

When receiving the notification of an instruction to change the luminance from the application 151, the intermediate module 152 calls the luminance changing function of the system BIOS 120A through the HCI, and notifies the system BIOS 120A of an instruction to increase or decrease the luminance level (Step 13).

When receiving the notification of the instruction to increase or decrease the luminance level from the intermediate module 152, the BIOS 120A uses its own luminance changing function to derive values of parameters for the high quality video engine 115 corresponding to the luminance level obtained by increasing or decreasing the current luminance level, for example, by one step, in accordance with the instruction and with reference to the table shown in FIG. 5 or 6 by way of example. Next, the luminance changing function of the BIOS 120A sets (resets) the derived values of the parameters for the high quality video engine 115 and the value indicating the luminance level into the high quality video engine parameter register and the LCD parameter register provided beforehand in the EC/KBC 124, respectively (Step S14).

The EC/KBC 124 sets (resets) values of correction parameters into the correction parameter register 203 in the high quality video engine 115 in accordance with the values set in the high quality video engine parameter register, and sets (resets) the luminance of the backlight of the LCD 17 in accordance with the value set in the LCD parameter register (Step S15).

The high quality video engine 115 performs the high quality video process using the correction parameters set in the correction parameter register 203, and outputs a processed image to the LCD 17 whose backlight luminance has been changed (Step S16).

As described above, according to the embodiment, the quality of the image displayed on the LCD can be kept uniform without producing no flashing highlights or no black level saturation in the image even when the user changes the setting of the luminance of the backlight into the maximum or minimum by way of example.

In the embodiment, the graphics controller 114 serves as a first signal processing unit that generates a first signal (signals transmitted through lines 1 and 2A) for displaying an image on a display device (LCD 17). The high quality video engine 115 serves as a second signal processing unit that performs an image quality improving process upon the first signal to generate a second signal (signals transmitted through lines 2C and 2D) for displaying an image on the display device (LCD 17). The EC/KBC 124 serves as a control unit that control the second signal processing unit to perform the image quality improving process in accordance with a luminance level of the display device (LCD 17). The TV start button 15A, the DVD/CD start button 15B, and keyboard 13 serves as a luminance operation unit for changing the luminance level of the display device (LCD 17). The switch 118 serves as a selector that selectively outputs either one of the first and the second signal to the display device (LCD 17). The BIOS-ROM 120 serves as a memory unit that stores a reference table (tables such shown in FIGS. 5 and 6) indicating each pair of a value of the luminance level and a parameter for the second signal processing unit to perform the image quality improving process.

Although the embodiment has been described about the case where there is an operation of changing the luminance of the backlight of the LCD 17, the invention is not limited to such a case. The invention is also applicable to the case where there is an operation of changing the luminance of another light such as a front light of the LCD 17.

Although the embodiment has shown the case where there is an operation of changing the luminance of the backlight of the LCD 17, the invention is not limited to such a case. The invention is also applicable to the case where a luminance change event occurs due to another factor. For example, the invention is also applicable to the case where a mechanism for changing the luminance of the light of the LCD 17 in accordance with the increase/decrease of the battery level in power management is provided.

Although the embodiment has shown the case where the process for deriving the values of parameters for the high quality video engine 115 from the luminance level and with reference to a table is carried out by the luminance changing function of the BIOS 120A, the EC/KBC 124 may be designed to carry out this process instead. In this case, it is not necessary to provide the high quality video engine parameter register in the EC/KBC 124, but the EC/KBC 124 derives the values of parameters for the high quality video engine 115 from the value of the luminance level set in the LCD parameter register.

The embodiment has been described about the example where a video signal from the graphics controller 114 is sent directly to the LCD 17 bypassing the high quality video engine 115 when a still image data is included in a display image to be displayed on the LCD 17. However, color correction or the like may be performed not only on motion pictures but also still image datas by the high quality video engine 115. Although the high quality video process is performed on a YUV video signal, it may be performed on a RGB video signal.

In addition, the graphics controller 114 and the high quality video engine 115 may be implemented by a single LSI. In this case, the graphics controller 114 and the high quality video engine 115 serve as two signal processing portions in the LSI respectively.

As described above with reference to the embodiment, according to the invention, a high-quality image display can be kept in spite of an operation for changing the luminance of a light of a display device.

The invention is not absolutely limited to the embodiment. In an execution phase, constituent parts can be modified to give a shape to the invention without departing the scope and spirit thereof. In addition, various inventions can be formed by suitable combinations of a plurality of constituent parts disclosed in the aforementioned embodiment. For example, some constituent parts may be deleted from the whole constituent parts disclosed in the embodiment. Further, constituent parts in different embodiments may be combined suitably.

What is claimed is:

1. An information processing apparatus comprising:
a body;
a first signal processing unit that generates a first signal for displaying an image on a display device connected to the body;
a second signal processing unit that performs an image quality improving process upon the first signal to generate a second signal for displaying an image on the display device;
a control unit that executes a Basic Input/Output System (BIOS) and an intermediate module, the control unit configured to refer to a table and change a setting of parameters used in the second signal processing unit that generates the second signal in accordance with instructions provided by the BIOS when the BIOS receives from the intermediate module a notification to increase or decrease a luminance level of the display device selectable by a user; and a selector provided to selectively connect one of the first signal processing unit or the second signal processing unit to the display device, wherein the selector connects the first signal processing unit to the display device when the first signal includes a still image data and connects the second signal processing unit to the display device when the second signal includes a moving image data.

2. The information processing apparatus according to claim 1, further comprising the display device in which the luminance level thereof being variable.

3. The information processing apparatus according to claim 1, wherein the second signal processing unit performs the image quality improving process upon the first signal when the first signal includes moving image data.

4. The information processing apparatus according to claim 1, further comprising a luminance operation unit that is operated to change the luminance level of the display device.

5. The information processing apparatus according to claim 4, wherein the control unit causes the second signal processing unit to perform the image quality improving process in accordance with the luminance level of the display device changed by the operation input through the luminance operation unit.

6. The information processing apparatus according to claim 5, wherein the control unit causes the display device to change the luminance level in accordance with the operation input through the luminance operation unit.

7. The information processing apparatus according to claim 4, wherein the control unit causes the display device to change the luminance level stepwise in accordance with the operation input through the luminance operation unit.

8. The information processing apparatus according to claim 1, further comprises a memory unit that stores a reference table indicating each pair of a value of the luminance level and a parameter for the second signal processing unit to perform the image quality improving process, wherein the control unit stores the parameter and controls the second signal processing unit to perform the image quality improving process by setting the stored parameter to the second signal processing unit.

9. The information processing apparatus according to claim 8, wherein the parameter includes at least one of parameters of contrast, brightness, hue, saturation and gamma correction.

10. The information processing apparatus according to claim 8, wherein the parameters are optimized for preventing white crushing or black level saturation from occurring in the displayed image.

11. A display control method for displaying an image on a display device, the method comprising:

generating, by a first signal processing unit, a first signal for displaying an image on the display device;

generating, by a second signal processing unit, a second signal for displaying an image on the display device by performing an image quality improving process upon the first signal;

executing, by a control unit, a Basic Input/Output System (BIOS) and an intermediate module, the control unit configured to refer to a table and change a setting of parameters used in the second signal processing unit in accordance with instructions provided by the BIOS when the BIOS receives from the intermediate module a notification to increase or decrease a luminance level of the display device selectable by a user; and selectively connecting one of the first signal processing unit or the second signal processing unit to the display device, wherein said selectively connecting the first signal processing unit to the display device occurs when the first signal includes a still image data and said selectively connecting the second signal processing unit to the display device occurs when the second signal includes a moving image data.

12. The display control method according to claim 11, further comprising changing the luminance level of the display device in accordance with an operation input through a luminance operation unit.

13. The display control method according to claim 12, wherein the second signal processing unit performs the image quality process in accordance with the luminance level of the display device.

14. The display control method according to claim 12, wherein the luminance level of the display device is changed stepwise in accordance with the operation input through the luminance operation unit.

15. The display control method according to claim 11, further comprises:

storing in a memory unit a reference table indicating each pair of a value of the luminance level and a parameter for the second signal processing unit to perform the image quality improving process; and controlling the second signal processing unit to perform the image quality improving process by setting the parameter to the second signal processing unit.

16. The display control method according to claim 15, wherein the parameter includes at least one of parameters of contrast, brightness, hue, saturation and gamma correction.

17. The display control method according to claim 15, wherein the parameters are optimized for preventing white crushing or black level saturation from occurring in the displayed image.

* * * * *